Oct. 30, 1962     H. F. RUNGE     3,061,116
ARTICLE HANDLING APPARATUS
Filed May 4, 1959
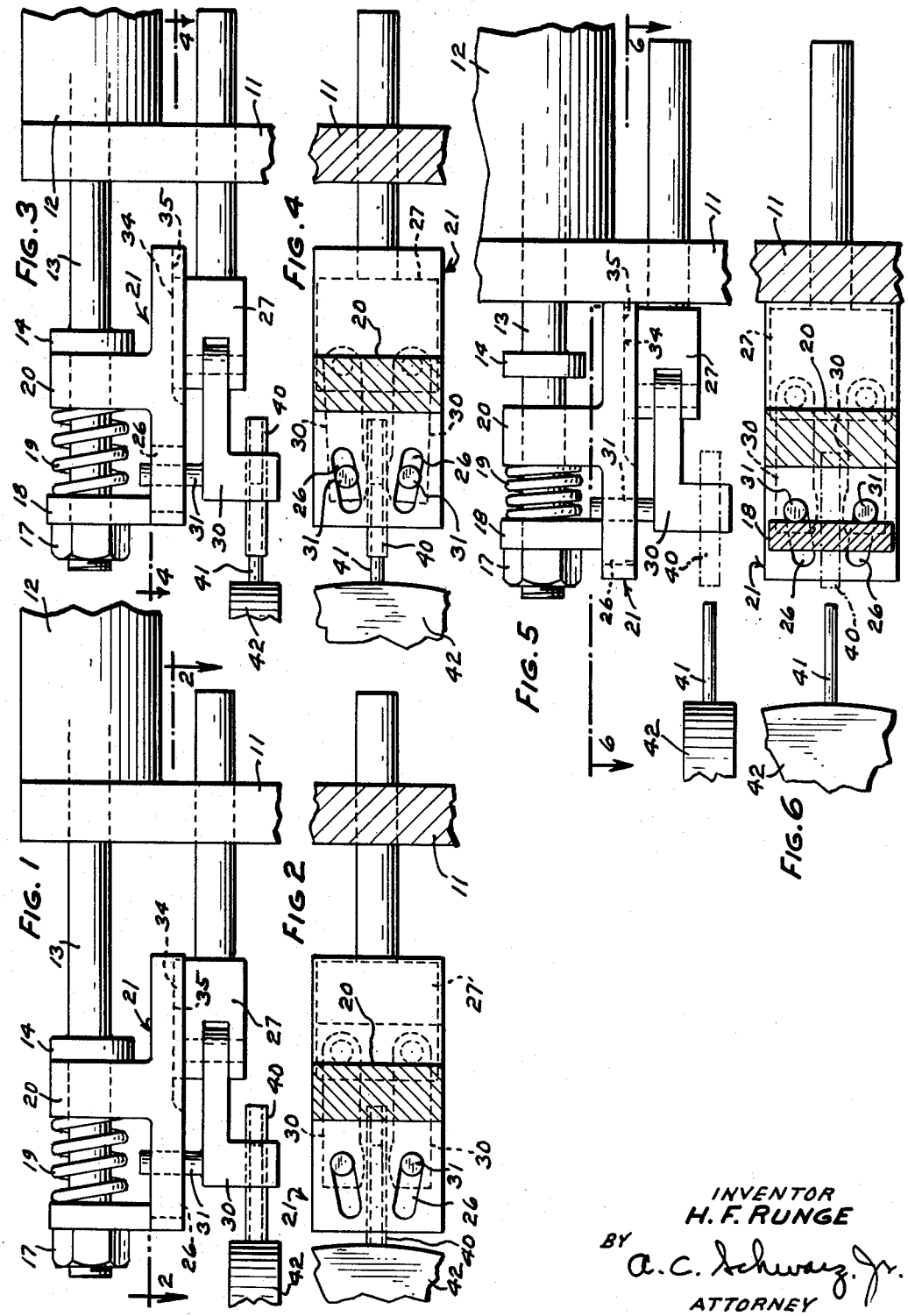
INVENTOR
H. F. RUNGE
BY
a.C. Schwarz, Jr.
ATTORNEY

United States Patent Office 3,061,116
Patented Oct. 30, 1962

3,061,116
ARTICLE HANDLING APPARATUS
Heinz F. Runge, Brookfield, Ill., assignor to Western Electric Company, Incorporated, New York, N.Y., a corporation of New York
Filed May 4, 1959, Ser. No. 810,748
7 Claims. (Cl. 214—1)

This invention relates to article handling apparatus and more particularly to devices for withdrawing fabricated work parts from an indexing table.

One of the problems commonly faced in the automatic manufacture of articles is the removal of the fabricated article from whatever device is supporting it during the fabricating operation, the supporting device generally being utilized to transport the article from one fabricating station to another. In the past, article withdrawal devices have been complex and inefficient. With this in mind, one of the objects of this invention is to provide an efficient article withdrawal device of simplified construction.

Another object of this invention is to provide novel and improved article handling apparatus.

Still another object of this invention is to provide a novel and improved device for withdrawing articles from an indexing table.

A further object of this invention is to provide a device having a pair of article-gripping jaws operated in advance and retract strokes and which close to grip an article during the beginning of the retract stroke and open to release the article during the end of the retract stroke.

One embodiment of the present invention may include a slidably mounted member having a pair of pivoted jaws for gripping a work part, and a camming member connected to the jaws and operated by an air cylinder. A predetermined amount of lost motion is provided between the camming member and the slidable member so as to insure that the jaws are closed during the beginning of a retract stroke and are opened during the last portion of the retract stroke.

Other objects and advantages of this invention will become apparent when the following detailed description is read in conjunction with the appended drawing, in which:

FIG. 1 is a fragmentary side view of a device embodying the principles of the invention and illustrating the positions of various elements of the device at the end of an advance stroke;

FIG. 2 is a sectional view taken on line 2—2 of FIG. 1 illustrating positions of jaws of the device in open position;

FIG. 3 is a fragmentary side view of the device at the beginning of a retract stroke;

FIG. 4 is a sectional view taken on line 4—4 of FIG. 3 illustrating the manner in which a camming member closes the jaws to grip a work part;

FIG. 5 is a fragmentary side view of the device after the retract stroke; and

FIG. 6 is a sectional view taken along line 6—6 of FIG. 5 showing the jaws in their open position at the end of the retract stroke.

Referring now in detail to the drawing, a base 11 is shown supporting an air cylinder having a piston rod 13 which is provided with a flange 14. A nut 17 threaded onto the end of the rod 13 cooperates with the flange 14 to hold therebetween a collar 18, a compression spring 19 and a flange 20 of a camming member 21, the spring 19 being positioned on the rod 13 between the collar 18 and the flange 20. The flange 20 is movable on the rod 13 against the action of the spring 19.

The camming member 21 is provided with a pair of slots 26 which converge as they extend toward the forward end of the member 21. The collar 18 is adapted to slide along the forward portion or end of the member 21 when this member is moved on the rod 13.

A jaw-carrying member 27 slidably mounted on the base 11 has pivoted thereto a pair of jaws 30, each of which is provided with a vertically extended pin 31 positioned in one of the slots 26 in the camming member 21. A rib 34 on the slidable member 27 is positioned in a slot 35 in the camming member 21 so as to maintain an alignment between these parts. The jaws 30 are adapted to cooperate in gripping and withdrawing a tubular work part or sleeve 40 positioned on a pin 41 carried by an indexing table 42 of a well-known type.

In operation, the air cylinder 12 is operated to move the rod 13 to the left into position illustrated in FIGS. 1 and 2. During this movement, if the pins 31 are not already at the rear of the slots 26, the camming member 21 slides relative to the jaw-carrying member 27, which tends to remain stationary due to its inertia, until the pins 31 reach the rear-most portion of the slots 26 at which time the jaws 30 are fully open. The slidable member 27 and the jaws 30 will then be carried with the moving camming member 21 into the positions illustrated in FIGS. 1 and 2. This is the advance stroke.

The air cylinder 12 is then operated to move the rod 13 to the right in its retract stroke. During the first part of this retract stroke, the camming member 21 slides to the right relative to the jaw-carrying member 27, which again tends to remain stationary due to its inertia. The convergence of the slots 26 in the moving member 21 cams the pins 31 toward each other to cause the jaws 30 to grip the sleeve 40. When the sleeve 40 is tightly gripped by the jaws 30, the pins 31 can move no further in the slots 26 and the member 27, with the jaws 30 gripping the sleeve 40, will move to the right to remove the sleeve 40 from the pin 41.

After the sleeve 40 clears the pin 41, a rear portion of the camming member 21 engages the base 11 and the camming member is stopped. Upon further movement of the rod 13, the collar 18 slides along the forward portion of the camming member 21 into engagement with the pins 31 and pushes these pins to the right. As the pins 31 are pushed to the right, with the camming member 21 held stationary, the divergence of the slots 26 cams the pins 31 apart to open the jaws 30 and the sleeve 40 drops from the device. The above operations are then repeated to remove another sleeve from the index table 42.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for handling articles, comprising a base, a jaw-carrying member slidably mounted on the base, a pair of jaws pivotally attached to the jaw-carrying member and having a pair of parallel pins, a camming member slidably engaging the jaw-carrying member and having a pair of divergent slots for receiving said pins in such a manner that movement of the camming member relative to the jaw-carrying member in an advance direction opens the jaws and movement of the camming member relative to the jaw-carrying member in a retract direction closes the jaws, means on the base for actuating the camming member first in the advance direction and then in the retract direction, and means operated by the actuating means for engaging the pins and moving the jaw-carrying member relative to the camming member after said camming member has been moved in the retract direction.

2. A device for handling articles, comprising a base, a jaw-carrying member slidably mounted on the base, a pair of jaws pivotally attached to said member for cooperating in gripping an article, said jaws each having an extending pin, a camming member slidably engaging the jaw-carrying member and having a pair of slots for receiving the pins, said slots converging in such a manner that the jaws are opened when the camming member is moved in an advance direction relative to the jaw-carrying member and are closed when the camming member is moved in a retract direction relative to said jaw-carrying member, an air cylinder mounted on the base and having a piston rod slidably attached to the camming member, said rod having a flange thereon, a collar attached to the end of the piston rod, and a compression spring mounted on the piston rod between the collar and the camming member so as to urge the camming member against the flange on said rod, said camming member having a portion adapted to engage the base during said movement in a retract direction so as to cause the collar to move against the action of the spring for engaging the pins attached to the jaws and moving said pins in the slots in the camming member.

3. A device for handling articles which comprises, movably mounted jaw means, an actuating member mounted for movement between an advanced and a retracted position, a reciprocating member mounted for movement relative to said jaw means within limits and said actuating member within limits, interengaging cam means on said reciprocating member and said jaw means, resilient means yieldably holding said reciprocating member in a position fixed relative to said actuating member so that said reciprocating member is moved by said actuating member relative to said jaw means as said actuating member moves toward its retracted position, whereby said cam means close said jaw means to grip an article therebetween, stop means for limiting the movement of said reciprocating member by said actuating member, and means connected to said actuating member and movable thereby for moving said jaw means relative to said reciprocating member after said stop means has become operative whereby said cam means open said jaw means and release the article.

4. A device for handling articles which comprises, a movably mounted carriage, a pair of jaws on said carriage movable relative to one another between a closed article gripping position and an open article releasing position, a movably mounted actuating member, a reciprocating member movable relative to said carriage within limits and said actuating member within limits, resilient means yieldably holding said reciprocating member in a position fixed relative to said actuating member whereby said reciprocating member is moved by said actuating member between an advanced and a retracted position, and interengaging cam means on said reciprocating member and said jaws for opening said jaws when said reciprocating member moves toward its advanced position relative to said carriage and for closing said jaws when said reciprocating member moves toward its retracted position relative to said carriage, said carriage having inertia of such magnitude that it remains substantially stationary during initial movement of said reciprocating member toward its retracted position whereby said reciprocating member moves relative to said carriage to close said jaws, said carriage subsequently traveling with said reciprocating member toward its retracted position, stop means for limiting the movement of said reciprocating member with said actuating member upon said reciprocating member reaching its retracted position, and means connected to said actuating member and movable thereby for moving said carriage relative to said reciprocating member after said stop means has become operative whereby said cam means open said jaws.

5. A device for handling articles which comprises, a movably mounted carriage, a movably mounted actuating member, a reciprocating member movable relative to said carriage within limits and said actuating member within limits, resilient means yieldably holding said reciprocating member in a position fixed relative to said actuating member whereby said reciprocating member is moved by said actuating member between an advanced and a retracted position, jaw means on said carriage movable between a closed article gripping position and an open article releasing position, pin means on said jaw means, said reciprocating member having cam slot means formed therein for receiving said pin means, said cam slot means cooperating with said pin means to open said jaw means when said reciprocating member moves toward its advanced position relative to said carriage and to close said jaw means when said reciprocating member moves toward its retracted position relative to said carriage, said carriage having inertia of such magnitude that it remains substantially stationary during initial movement of said reciprocating member toward its retracted position whereby said reciprocating member moves relative to said carriage to close said jaw means, said carriage subsequently traveling with said reciprocating member toward its retracted position, stop means for limiting the movement of said reciprocating member with said actuating member upon said reciprocating member reaching its retracted position, and means connected to said actuating member and movable thereby for moving said carriage relative to said reciprocating member after said stop means has become operative whereby said pin means and said cam slot means open said jaw means.

6. A device for handling articles which comprises, a movably mounted carriage, a movably mounted actuating member, a reciprocating member movable relative to said carriage within limits and said actuating member within limits, resilient means yieldably holding said reciprocating member in a position fixed relative to said actuating member whereby said reciprocating member is moved by said actuating member between an advanced and a retracted position, a pair of jaws on said carriage movable relative to one another between a closed article gripping position and an open article releasing position, a pair of parallel pins on said jaws, said reciprocating member having a pair of divergent slots formed therein for receiving said pins, said divergent slots cooperating with said pins for opening said jaws when said reciprocating member moves toward its advanced position relative to said carriage and for closing said jaws when said reciprocating member moves toward its retracted position relative to said carriage, said carriage having inertia of such magnitude that it remains substantially stationary during initial movement of said reciprocating member toward its retracted position whereby said reciprocating member moves relative to said carriage to close said jaws, said carriage subsequently traveling with said reciprocating member toward its retracted position, stop means for limiting the movement of said reciprocating member with said actuating member upon said reciprocating member reaching its retracted position, and means connected to said actuating member and movable thereby into engagement with said pins after said stop means has become operative, to move said carriage relative to said reciprocating member whereby said divergent slots and said pins open said jaws.

7. A device for handling articles which comprises, a base, a movably mounted carriage, a movably mounted actuating member, a reciprocating member movable relative to said carriage within limits and said actuating member within limits, stop means on said actuating member, resilient means biasing said reciprocating member against said stop means into a position fixed relative to said actuating member whereby said reciprocating member is moved by said actuating member between an advanced and a retracted position, interengaging guide means on said reciprocating member and said carriage for maintaining said reciprocating member and said carriage in alignment, a pair of jaws on said carriage movable relative to one another between a closed article gripping position and an open article releasing position, a pair of parallel pins on said jaws, said reciprocating member having a pair of divergent slots formed therein for receiving said pins, said divergent slots cooperating with said pins for opening said jaws when said reciprocating member moves toward its advanced position relative to said carriage and for closing said jaws when said reciprocating member moves toward its retracted position relative to said carriage, said carriage having inertia of such magnitude that it remains substantially stationary during initial movement of said reciprocating member toward its retracted position whereby said reciprocating member moves relative to said carriage to close said jaws, said carriage subsequently traveling with said reciprocating member toward its retracted position, said reciprocating member being engageable with said base for limiting the movement of said reciprocating member with said actuating member, and means connected to said actuating member and movable thereby into engagement with said pins after said reciprocating member has engaged said base, to move said carriage relative to said reciprocating member whereby said divergent slots and said pins open said jaws.

References Cited in the file of this patent

UNITED STATES PATENTS

| | | |
|---|---|---|
| 79,159 | Sweetland | June 23, 1868 |
| 685,872 | Sanford | Nov. 5, 1901 |
| 1,575,185 | Stenhouse | Mar. 2, 1926 |
| 2,584,466 | Kaserman | Feb. 5, 1952 |
| 2,894,616 | Young | July 14, 1959 |
| 2,901,126 | Halberstodt | Aug. 25, 1959 |